United States Patent
Shue et al.

(10) Patent No.: US 8,473,124 B2
(45) Date of Patent: Jun. 25, 2013

(54) FLIGHT CONTROL SYSTEM HAVING A THREE CONTROL LOOP DESIGN

(75) Inventors: Shyhpyng Jack Shue, Grapevine, TX (US); John J. Shillings, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 810 days.

(21) Appl. No.: 11/665,138

(22) PCT Filed: Nov. 8, 2005

(86) PCT No.: PCT/US2005/040394
§ 371 (c)(1),
(2), (4) Date: Apr. 11, 2007

(87) PCT Pub. No.: WO2007/018572
PCT Pub. Date: Feb. 15, 2007

(65) Prior Publication Data
US 2008/0097658 A1 Apr. 24, 2008

Related U.S. Application Data

(60) Provisional application No. 60/625,848, filed on Nov. 8, 2004.

(51) Int. Cl.
*G06F 19/00* (2006.01)
*G01C 22/00* (2006.01)

(52) U.S. Cl.
USPC .......... 701/4; 701/12; 700/29; 700/44; 700/90

(58) Field of Classification Search
USPC .............. 701/24, 11, 13, 4, 23, 3, 12; 395/22, 395/21; 244/158 R, 164, 176; 60/791, 39; 318/560, 434; 700/29, 44, 90
See application file for complete search history.

(56) References Cited

U.S. PATENT DOCUMENTS

| | | | | |
|---|---|---|---|---|
| 5,796,922 | A * | 8/1998 | Smith | 706/23 |
| 6,089,507 | A * | 7/2000 | Parvez et al. | 244/158.8 |
| 6,539,290 | B1 | 3/2003 | Vos | |
| 7,277,764 | B2 * | 10/2007 | Hovakimyan et al. | 700/28 |
| 2003/0094001 | A1 * | 5/2003 | Desai et al. | 60/791 |
| 2005/0004723 | A1 * | 1/2005 | Duggan et al. | 701/24 |

FOREIGN PATENT DOCUMENTS

WO 01/92972 A 12/2001

OTHER PUBLICATIONS

Supplementary European Search Report for Application No. EP 05 85 8477.
Canadian Office Action from CA counterpart Application No. 2,585,105, issued by the Canadian Intellectual Property Office on Oct. 22, 2010.
European Office Action from EP counterpart Application No. 05858477.2 issued by the European Patent Office on Sep. 22, 2011.
European Office Action from EP counterpart Application No. 05858477.2, issued by the European Patent Office on Mar. 18, 2011.

* cited by examiner

*Primary Examiner* — Ronnie Mancho
(74) *Attorney, Agent, or Firm* — James E. Walton; Richard G. Eldredge

(57) ABSTRACT

A flight control system is configured for controlling the flight of an aircraft utilizing a three control loop design to robustly increase system performance. An inner loop comprises an improved linear quadratic regulator (LQR) search method, and an outer loop comprises a classic feedback summary gain design. A third loop comprises a steady state trim search method.

14 Claims, 10 Drawing Sheets

YAW SCAS (22)
Y_AttSw=1 WHEN SPEED IS LESS THAN 40kts
(Turn_Coord IS NOT ON),
OTHERWISE Y_AttSw=0

ROLL HEADING HOLD (10)

YAW OUTER LOOP (23)

FLIGHT CONTROL SYSTEM HAVING A THREE CONTROL LOOP DESIGN

TECHNICAL FIELD

The present invention relates generally to the field of flight control systems for manned and unmanned aircraft and specifically to systems configured for robustly improving flight performance.

DESCRIPTION OF THE PRIOR ART

Control of an unstable aircraft flight system, such as a helicopter, has proven to be very challenging using classic feedback control laws. One method for controlling a helicopter employs purely classic feedback control laws, and this method requires a significant amount of flight testing to adjust individual gains to ensure the system's stability. In addition, flight quality depends upon adjustment of these gains and the natural design of the helicopter. Improvement of the system performances and maneuvers are limited, and robustness of the flight control system may not be considered in this method.

Another method is classic feedback with optimal gain search. For this method, the individual optimal search algorithm needs to be manually computed to be added into the system. When the flight performance is not as desired, changing these gains takes time, which may delay flight testing and increase engineering hours. The improved performance for this method is also limited, and robustness of the system is not guaranteed in this method.

It should be noted that by stabilizing the whole system, the designer needs to introduce many error corrections and gain-scheduling techniques. However, while trying to stabilize the system and also guide the aircraft in all maneuvers, the classic feedback control laws may need to fine tune all gains so that the control laws can complete their objectives. This method does not lead to the development of sufficiently robust control laws.

SUMMARY OF THE INVENTION

There is a need for a flight control system that provides for an improved flight control system having a three control loop design.

Therefore, it is an object of the present invention to provide a flight control system that provides for an improved flight control system having a three control loop design.

A flight control system is configured for controlling the flight of an aircraft utilizing a three control loop design to robustly increase system performance. An inner loop comprises an improved linear quadratic regulator (LQR) search method, and an outer loop comprises a classic feedback summary gain design. A third loop comprises a steady state trim search method.

The present invention includes significant benefits and advantages, including: (1) increasing handling qualities and performance for piloted aircrafts; (2) increasing robustness for unmanned aircrafts; (3) reducing flight test time; (4) reducing flight control law development time; (5) providing for easily applied intelligent portion for unmanned control; (6) providing for the system to be easily understood and implemented by engineers; and (7) using all advantages from classic feedback and modern control methods and eliminating their disadvantages.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention is directed to a three control loop flight control system configured for automatically controlling the flight of an aircraft. One purpose of the present invention is to make an open-loop unstable aircraft system stable by: (1) making the system stable first; (2) allowing the aircraft to be capably guided to any waypoint with any required airspeed; and (3) allowing the aircraft to save control effort for possible maneuvers.

The three control loop design of the present invention will robustly enlarge the stability of the aircraft control laws. Instead of using classic feedback control law, the present invention enhances the system by: (1) leaving the strongest portion of classic feedback control system; and (2) introducing two other control laws to handle the natural weakness of classic feedback control law. The present invention saves flight test periods and shortens the time required to design control laws. Use of the three control loops has been as capable of making unstable aircraft to be not only stabilized but also guided and navigated, whereas the pure classic feedback control laws cannot even stabilize the system.

The present invention applies three control techniques to stabilize, guide, and navigate the aircraft at the same time. All control techniques are pre-programmed. In this way, the present invention reduces gain search and adjustment efforts from development to flight test. In addition, the invention ensures the aircraft will have the best performance and handling quality by satisfying eigenvalue and damping ratio criterion, as well as eigenvalue and eigenvector bound per fast and slow frequency. The maneuverable relationship between lateral, longitudinal, and control power are extremely improved. The control effort for standard simple maneuvers is essentially reduced through the use of a steady state trim search control loop.

Aircraft control, guidance, and navigation are implemented by a group of linear models, which are computed from aerodynamic analysis. The aerodynamic analysis input is generated from wind tunnel data with computational fluid dynamics information. The linear models generated have been shown to provide the closest agreement between the flight test and real time simulation. Therefore, as the design concept has been shown to be fully controllable with very good maneuvers in the simulation, it can be employed to guide the helicopter to anywhere at any speed and at any altitude. In order to improve flight maneuvers and performance and increase robustness of the system from technical experience, classic flight control laws are re-designed and divided into three portions.

Figure 1:
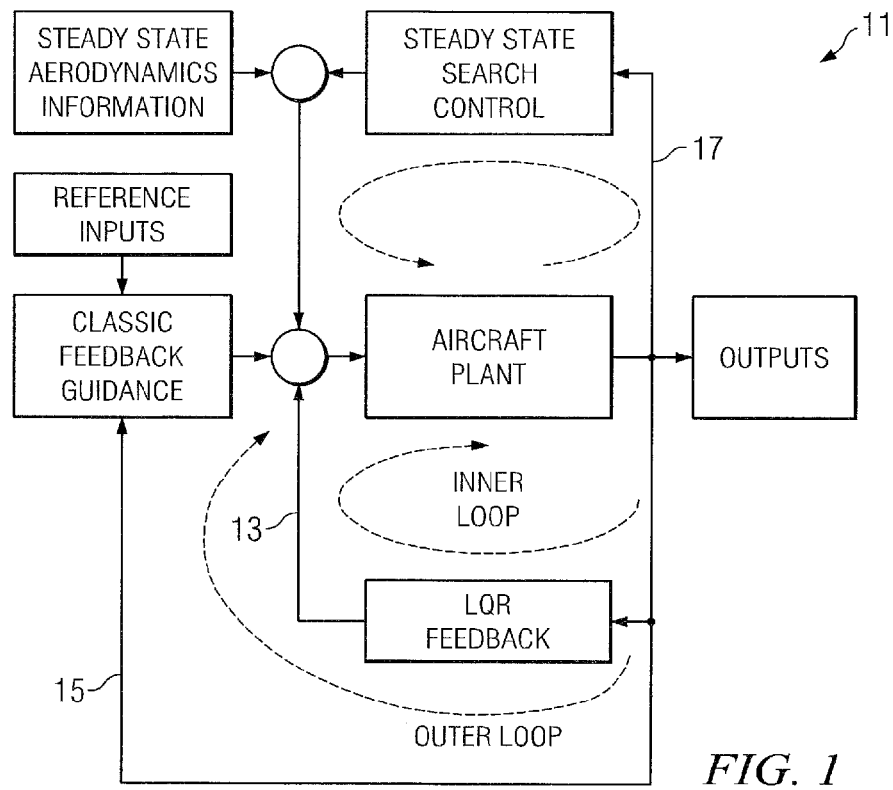
FIG. 1 is a schematic view of a flight control system according to the present invention.

Referring to the figures, FIG. 1 is a schematic view of one embodiment of the flight control system according to the invention. System 11 comprises three loops: inner loop 13; outer loop 15; and steady state trim loop 17. Each loop has linear models.

Inner loop 13 is introduced from optimal modern control concept with best phase margin and gain margin concept to achieve stabilization of the system. To accomplish the best phase margin and gain margin design, an algorithm based on eigenvalue, eigenvector, and damping ratio from time domain approach is employed.

Outer loop 15 is inherited from the classic feedback control laws. This portion is improved through a summary gain design, wherein instead of adjusting individual gains, the summary gain design is employed to shorten gain selection. The main purpose of this outer loop is to guide the helicopter to desired yaw angle, roll angle, airspeed, and altitude.

Steady state trim loop 17 is used to automatically search for the best trim conditions at any flight conditions in order to save control effort for other flight maneuvers. Steady state trim search control law design is employed in steady state trim loop 17 to find the best flight condition under any one of the following objectives: (1) altitude rate, $\dot{h}$, to be close to zero for level flight or a constant value for steady state climbing; (2) roll rate, p, to be close to zero for level flight or a constant value for level turn in higher airspeed; and (3) yaw rate, r, to be close to zero for level flight or a constant value for level turn in lower airspeed. Therefore, the flight control laws will automatically catch the trim flight, such as: steady state level flight; steady state coordinate turn; steady state climbing while airspeed is fixed; and steady state increasing airspeed while altitude is held. By utilizing the present invention, the system will always fly close to its trim condition. When control effort required for steady state trim is minimized, the remaining control authority allows the aircraft to fly more difficult maneuvers.

Definition of Simulation Block Diagrams

Figure 2:
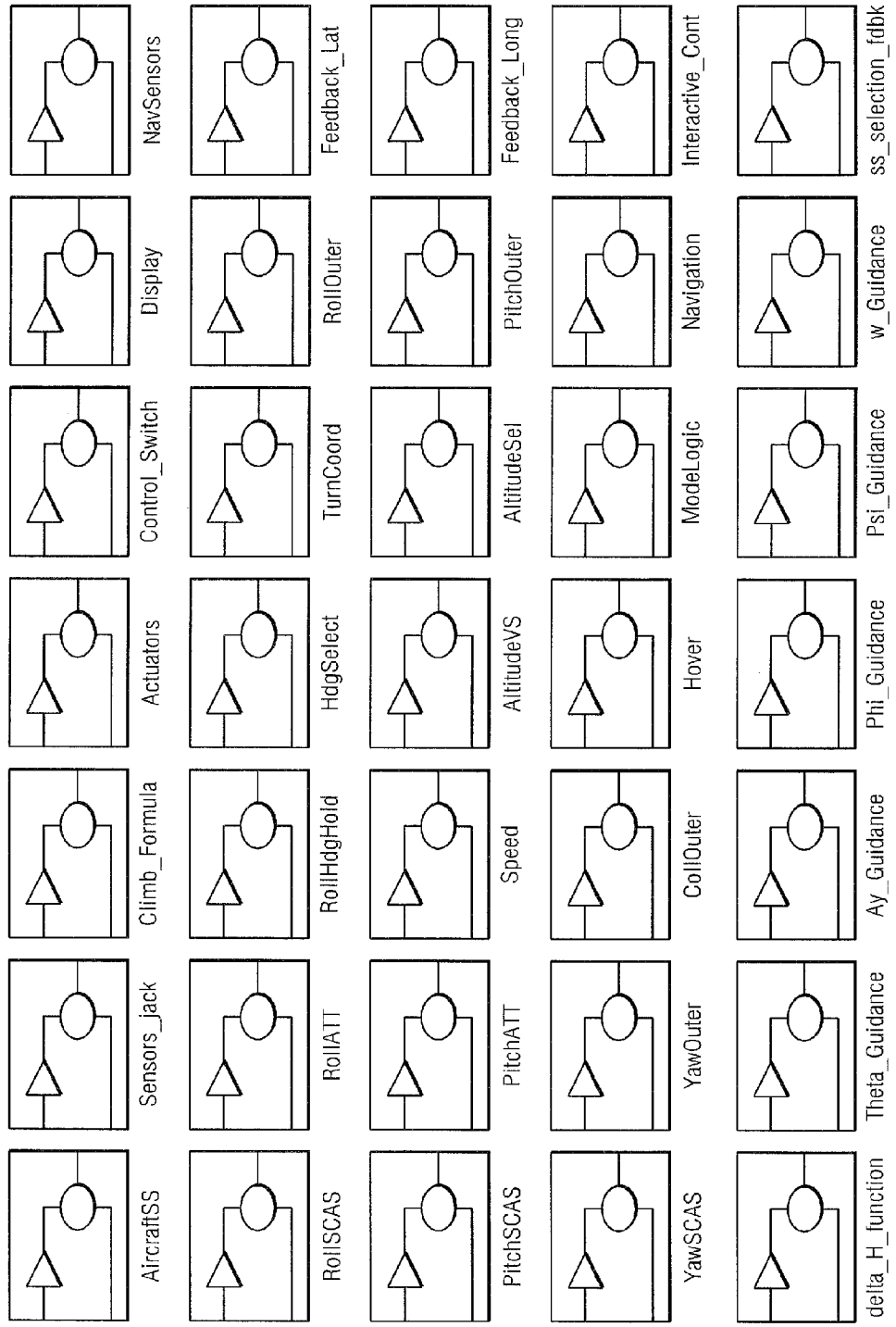
FIG. 2 is a schematic view showing block diagrams of portions of the system of FIG. 1.

Names and explanations of individual block diagram used in the simulation of the system of the invention are shown in FIG. 2 and tabulated in Table I below. Each block diagram may contain more than one control, guidance, or navigation logic element.

TABLE I

Block Diagram definition

| No | Block Name | Purpose |
|---|---|---|
| 1 | AircraftSS | Aircraft State Space equation of motion from analysis |
| 2 | Sensors_Jack | Aircraft six degree of freedom nonlinear equations of motion. |
| 3 | Climb_Formula | Computing the helicopter velocity U from u, v, and w. Use U to generate angle of attack, $\alpha$, and climb angle, $\gamma$, from pitch angle, $\theta$. |
| 4 | Actuators | There are four actuator dynamic functions in this diagram. They are Pedal, Lateral, Longitudinal, and Collective actuators. All actuators are with their limiter. |
| 5 | Control_Switch | This diagram is used to manually switch several modes. This diagram is like switch panels on a remote cockpit station. |
| 6 | Display | This diagram is employed to display all internal state variables used for the simulation. |
| 7 | NavSensors | NavSensor is similar to aircraft's Flight Management System (FMS). FMS contains three portions: Flight Plan, VNAV, and Waypoint NAV. |
| 8 | RollSCAS | RollSCAS guidance system |
| 9 | RollAttd | Roll Attitude Hold function |
| 10 | RollHdgHold | Heading Hold while rolling |
| 11 | HdgSelect | This block is to compute the heading from desired input so that the helicopter will fly to the desired heading during higher airspeeds. |
| 12 | TurnCoord | This block is to maintain steady state turn at airspeeds higher than 45 knots |
| 13 | RollOuter | To determine where the roll command feedback is coming from. |
| 14 | Feedback_Lat | LQR control feedback for stabilizing lateral control input |
| 15 | PitchSCAS | Pitch moment command for guidance purpose |
| 16 | PitchATTD | Several gains need to be adjusted correctly so that the PitchATTD will be held. These gains are: Q_gain, T_q_gain, T_gain, T_fdbk_gain, T_counter_Gain, Turn_Coord_q_gain. |
| 17 | Speed | Several gains need to be adjusted correctly so that the Speed will be held. These gains are: Spd_Ax_gain, Spd_udot_gain, Spd_TAS_gain, Spd_Counter_Gain, SPD_Sum_Gain, SPD_slew_Gain. |
| 18 | AltitudeVS | Several gains need to be adjusted correctly so that the Altitude_VS will be held. These gains are: Alt_q_gain, Alt_T_gain, Alt_Nz_gain, Alt_slew_Gain, Alt_slew_Gain1, Alt_Sum_Gain, Alt_Pitch_VS_Gain, Coll_Cmnd_VS_Gain. |
| 19 | AltitudeSel | This block is used to generate Alt_Track and Alt_Capture Boolean command for ensuring that Altitude in under tracking within ±20 feet. These values are determined by two constants in the block. |
| 20 | PitchOuter | This block is to determine whether the system pitch moment shall come from Hover or Pitch_VS or Pitch_Long. |
| 21 | Feedback_Long | LQR is used to generate the necessary Longitudinal feedback gain to stabilize Long_motion so that the guidance system will focus on its own rule and not on the system stabilization. |
| 22 | YawSCAS | This block is used to determine whether the YawSCAS shall get the necessary control calculation from Yaw-Ped (low speed) or from Roll cmnd (High speed). |
| 23 | YawOuter | This block is used to make helicopter turns at low speed. The following gains need to be adjusted correctly: Psi_Ay_gain, Psi_r_gain, Psi_r_sum_gain, Psi_CRS_gain, Psi_R_TF, Psi_Ay_TF, |
| 24 | CollOuter | Used to determine if the collective shall provide its control for hover or speed or Alt. There is one gain from Coll_TF, which can be used to adjust the force produced from coll_controller. |
| 25 | Hover | This block is used to determine x, y, and z distance for hover condition. |

TABLE I-continued

Block Diagram definition

| No | Block Name | Purpose |
|---|---|---|
| 26 | ModeLogic | Used to determine which mode shall be on and off with all aircraft conditions. |
| 27 | Navigation | This block is used to make helicopter turn. |
| 28 | Interactive_Cont | Used like remote control stick to make helicopter to go to the desire heading, airspeed, and altitude. Turn on/off manual switches to make helicopter to go the desired values. |
| 29 | Delta_H_Function | Used to compute the difference from u, v, and w for future function. |
| 30 | Theta_Guidance | Used to ensure Theta will go to the steady state value by LQR method. |
| 31 | Ay_Guidance | Used to ensure Theta will go to the steady state value by LQR method. |
| 32 | Phi_Guidance | Used to ensure Theta will go to the steady state value by LQR method. |
| 33 | Psi_Guidance | Used to ensure Theta will go to the steady state value by LQR method. |
| 34 | w_Guidance | Used to ensure Theta will go to the steady state value by LQR method. |
| 35 | ss_Selection_Fdbk | Uses gain schedule theory to provide the steady state trim values for all guidance blocks. Because of this design, the system will easily reach its steady state values while keeping the control effort to minimum. |

Block diagrams (1)-(7) model basic aircraft systems, which are well known in the art.

Block diagrams (8)-(13), (15)-(20), and (22)-(24) are designed based on classic feedback laws. These diagrams are to work as helicopter guidance systems.

Block diagrams (14) and (21) are developed from Linear Quadratic Regulator (LQR). While developing LQR control laws for inner loop system, decoupling of longitudinal and lateral functions is applied. In addition, separation of control laws with gain-scheduling control per true airspeed for LQR to actuators is also implemented.

Block diagrams of (6) and (25)-(27) are the intelligent portion of the system with avionics flight management system (FMS) for waypoint selection and navigation.

Block diagram (28) is worked as a remote flight control panel. It will allow remote pilots to input flight information, and the combination of this diagram with Display diagram (6) will form a remote ground station display system.

Block diagrams of (29)-(35) are for Steady State Trim Search Loop 17 (FIG. 1). These diagrams are generated based on LQR model matching technology to search for the best steady state trim values in any flight conditions.

Inner Loop Stability Analysis and Control

Figure 3:
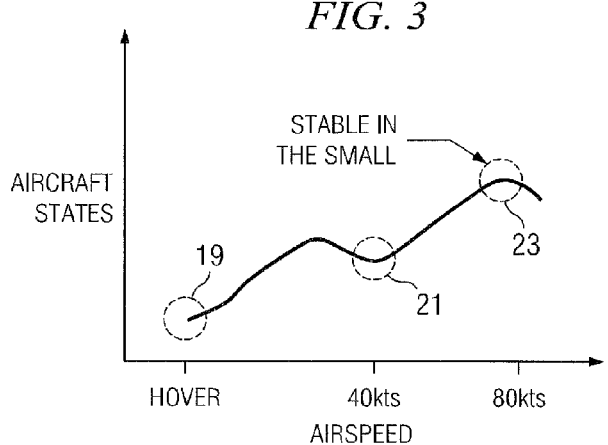
FIG. 3 is a graph showing aircraft states plotted against airspeed for a system using a LQR method.

Open loop eigenvalues of aircraft are often unstable. In order to avoid repeatedly adjusting all gains to make all open loop systems stable, a LQR technique is employed to achieve this goal quickly. However, there are several techniques also being employed to simplify the process of finding good control gains for the system so that the model can be stable on the bigger nonlinear stable domain. As shown in FIG. 3, LQR will allow the nonlinear helicopter system to be stable in, for example, small regions 19, 21, 23 immediately from its open loop unstable system.

In order to enlarge aircraft stability from a small region to a belt type of plane, full model decoupling, separation of control laws, and gain scheduling technique are applied, so that the stability of the system will be expanded. For example, FIG. 4 shows expanded stability region 25.

Figure 5:
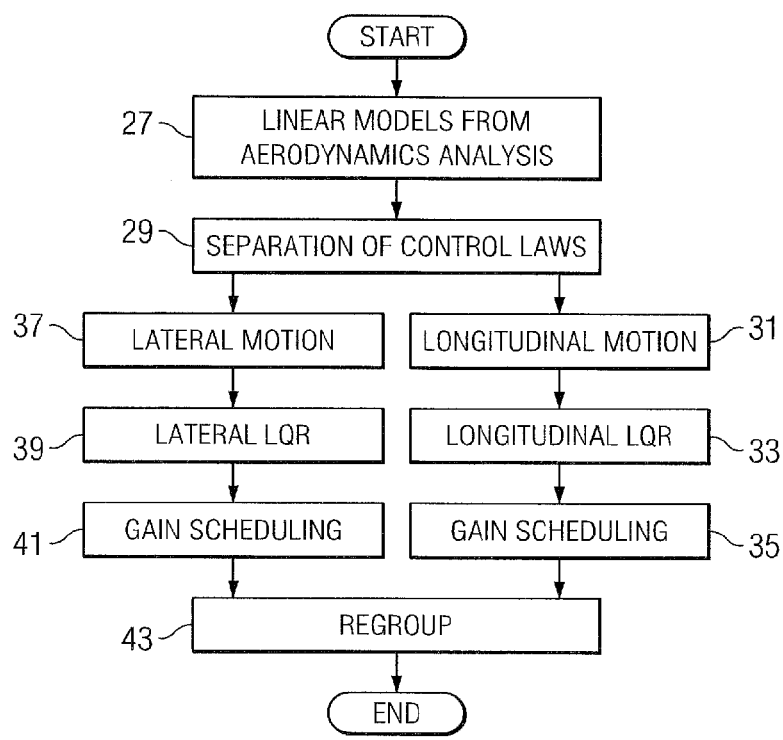
FIG. 5 is a flow chart showing the LQR method according to the present invention.
Figure 4:
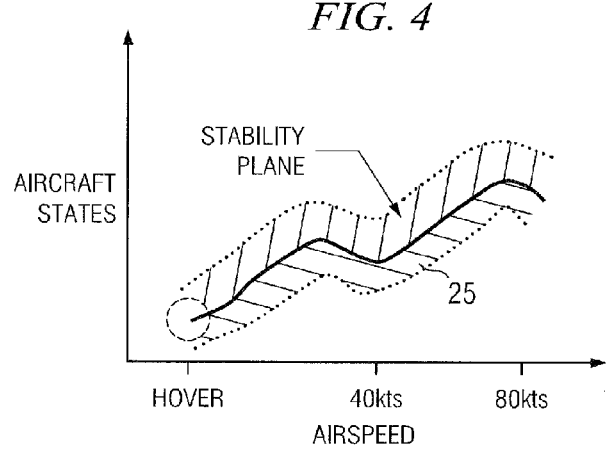
FIG. 4 is a graph showing aircraft states plotted against airspeed for a system according to the present invention.

The sequence process and computation methods to expand the stability region of FIG. 4 are represented by the flow chart depicted in FIG. 5. Block 27 represents the linear models derived from aerodynamics analysis and wind tunnel data, and block 29 shows the separation of control laws into flow paths for longitudinal and lateral component. The longitudinal motion input, represented by block 31, passes to longitudinal LQR block 33 and then to gain scheduling block 35. Likewise, the lateral motion input, represented by block 37, passes to lateral LQR block 39 and then to gain scheduling block 41. The outputs from each of these paths are then regrouped in block 43.

Decoupling Full Model

A linear model of aircraft can be obtained from aerodynamics data, and a group of linear models can be developed based on its airspeed. These linear models can be represented as follows:

$$\dot{X} = A_k X + B_k U \qquad \text{where } k = 0, 1, 2 \ldots, \text{ or } j \qquad (1)$$
$$Y = C_k X$$

where X is the state variables, $(u, v, w, \theta, \psi, p, q, r)^T$, U is control vector, $(\delta_{ped}, \delta_{long}, \delta_{lat}, \delta_{coll})^T$, Y is performance output vector, $(X^T, \dot{u}, \dot{v}, \dot{w}, \dot{p}, \dot{q}, \dot{r}, A_x, A_y, N_z)^T$. $A_0, A_1, A_2$ are the state matrices with k=0 for hover, k=1 for 10 knots and k=2 for 20 knots, respectively. Total model, j, selected for computation depends on the maximum airspeed of aircraft. $B_0, B_1, B_2$ are the control matrices, and $C_0, C_1, C_2$ are the performance output matrices. Please note that dimension of $(A_0, A_1, A_2)$ is 8×8, dimension of $(B_0, B_1, B_2)$ is 8×4, and dimension of $(C_0, C_1, C_2)$ is 17×8. Since these matrices are large and contain coupling terms of lateral and longitudinal motions within these matrices, it is difficult to determine the best performance LQR control gains for all at the same time. In order to overcome these issues, the full model in equation (1) is decoupled first. After decoupling lateral and longitudinal equations of motion, equation (1) can be transformed to Lateral Equation of Motion:

$$\dot{X}^{lat} = A_k^{lat} X^{lat} + B_k^{lat} U^{lat} \qquad \text{where } k = 0, 1, 2 \ldots, \text{ or } j \qquad (2)$$
$$Y^{lat} = C_k^{lat} X^{lat}$$

Longitudinal Equation of Motion:

$$\dot{X}^{long} = A_k^{long} X^{long} + B_k^{long} U^{long} \qquad \text{where } k = 0, 1, 2 \ldots, \text{ or } j \qquad (3)$$
$$Y^{long} = C_k^{long} X^{long}$$

where $X^{lat}$ is $(v, \phi, p, r)^T$, $X^{long}$ is $(u, w, \theta, q)^T$, $U^{lat}$ is $(\delta_{ped}, \delta_{lat})^T$, and $U^{long}$ is $(\delta_{long}, \delta_{coll})^T$. $A_k^{lat}$ and $A_k^{long}$ are 4×4 matrices, $B_k^{lat}$ and $B_k^{long}$ are 4×2 matrices, and $C_k^{lat}$ and $C_k^{long}$ are simplified to be 4×4 and 4×4 matrices, respectively. This implies that only state variables are employed to provide LQR full state feedback control laws.

After the full aircraft model (1) is decoupled to lateral (2) and longitudinal (3) motions, the effect of coupling terms between lateral and longitudinal motions can be reduced to minimum, while applying LQR to stabilize the system.

Improved Linear Quadratic Regulator (LQR)

Linear quadratic regulator (LQR), also known as optimal control law, has attracted plenty of attention in the aircraft industry since it was used on the General Dynamics/Lockheed Martin F-16 as its major feedback control system. The objective of LQR state regulation is to drive any initial condition errors to zero, thus it guarantees the stability of the system. To achieve this goal, the lateral and longitudinal control inputs, $U^{lat}$ and $U^{long}$, generated from (2) and (3), apply state feedback control laws as follows $$U_{lat} = -K^{lat} X^{lat} \quad (4)$$

$$U^{long} = -K^{long} X^{long} \quad (5)$$

to minimize lateral and longitudinal cost functions or performance indexes of the type $$\min\left\{J^{lat} = \frac{1}{2}\int_0^\infty \left(X^{lat^T} Q_{lat} X^{lat} + U^{lat^T} R_{lat} U^{lat}\right) dt\right\} \quad (4)$$

$$\min\left\{J^{long} = \frac{1}{2}\int_0^\infty \left(X^{long^T} Q_{long} X^{long} + U^{long^T} R_{long} U^{long}\right) dt\right\} \quad (5)$$

where state weighting matrices ($Q_{lat}$ and $Q_{long}$) are symmetric positive semi-definite and control weighting matrices ($R_{lat}$ and $R_{long}$) are positive definite with matched dimensions for state variables and control inputs.

Figure 6:
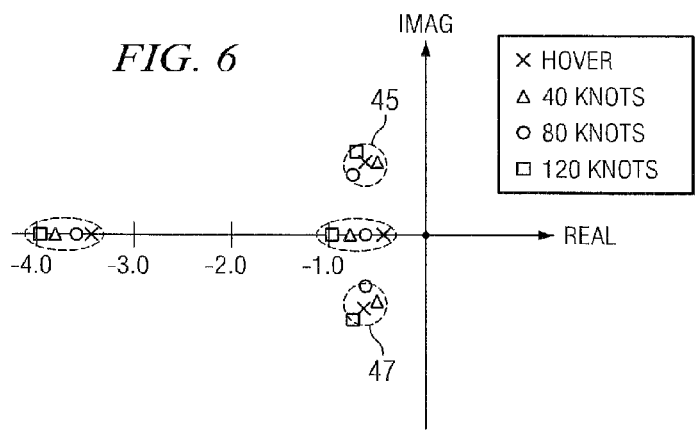
FIG. 6 is a graph showing the location of closed loop eigenvalues for longitudinal motions for different airspeeds.

It is very important to select a good performance criterion that will provide good stability and time responses for all control gains simultaneously. The following steps are experienced and summarized to find these best performance indexes for aircraft inner loop optimal state feedback control laws:

a) Initially set ($Q_{lat}$ and $Q_{long}$) to be very small positively diagonal values
b) Set ($R_{lat}$ and $R_{long}$) to be identity matrices
c) Adjust ($Q_{lat}$ and $Q_{long}$) only and leave ($R_{lat}$ and $R_{long}$) to be identity
d) Set the weighting coefficients related to its angular rate or speed states to be a multiple of 10 times its angles or distance states; for example, $q_w = 10 \cdot q_z$ and $q_r = 10 \cdot q_\psi$, where q is local weighting coefficient
e) After rules of (d) are set, multiply a constant positive value for weighting matrices to adjust all coefficients at one time
f) Check eigenvalues of closed loop and open loop systems and ensure individual eigenvalue shift is not too large
g) After all eigenvalues are close to the desired values, fine-tune the individual weighting coefficients to make improve performance With the above weighting selection rules, the optimal control gain generated from these weighting matrices will make the system stable for individual airspeeds, as shown in FIG. 3. Therefore, the optimal state feedback control gains from the weighting matrices ($Q_{lat}$ and $Q_{long}$) and ($R_{lat}$ and $R_{long}$) can be determined as $$K^{lat} = -R_{lat}^{-1} B_{lat}^T P_{lat} \quad (6)$$

$$K^{long} = -R_{long}^{-1} B_{long}^T P_{long} \quad (7)$$

where ($P_{lat}$ and $P_{long}$) are symmetric positive definite and satisfy the following algebraic Riccati equations (ARE)

$$A^{lat^T} P_{lat} + P_{lat} A^{lat} + Q_{lat} - P_{lat} B^{lat} R_{lat}^{-1} B^{lat^T} P_{lat} = 0 \quad (8)$$

$$A^{long^T} P_{long} + P_{long} A^{long} + Q_{long} - P_{long} B^{long} R_{long}^{-1} B^{long^T} P_{long} = 0 \quad (9)$$

with the following constraints
i) ($A^{lat}$, $B^{lat}$) and ($A^{long}$, $B^{long}$) are stabilizable
ii) ($A^{lat}$, $Q_{lat}^{1/2}$) and ($A^{long}$, $Q_{long}^{1/2}$) are detectable
iii) ($Q_{lat}$ and $Q_{long}$) are symmetric positive semi-definite and ($R_{lat}$ and $R_{long}$) are symmetric positive definite Note that individual eigenvalues of the linear system from the above process can be shifted to the certain specific region. For example, FIG. 6 shows all eigenvalues locations for airspeed on hover, 40 knots, 80 knots and 120 knots for longitudinal motion. This figure clearly shows that eigenvalues of all four different linear models are moved to very close regions 45, 47. Therefore, the guidance system used to direct the aircraft to any altitude, airspeed, and direction will not need to be gain scheduling.

Separation of Feedback Controls

In order to save control effort while stabilizing the system, separation of control laws is applied. The first control law is called "inner loop control" which applies LQR to stabilize the open-loop system as described above. After LQR state feedback control inputs for lateral and longitudinal motions are developed, these control inputs are fed back thru Actuator diagram (4). Instead of adding the whole vector by LQR method, the controls are separated per their feedback targets. For example, ($U_1^{lat}$, $U_2^{lat}$) are for yaw and lateral controller, respectively, and ($U_1^{long}$, $U_2^{long}$) are for longitudinal and collective controller, respectively. These controllers ($U_1^{lat}$, $U_2^{lat}$) and ($U_1^{long}$, $U_2^{long}$) are a portion of its total control. Total actuator shown in Actuator diagram (4) not only allows the system control from LQR, but also classic feedback guidance control and the steady state search method. Separation of total individual control can be divided into four or five portions as shown in Table II.

TABLE II

Separation of control

| Controller Motion | Control Name | Purpose |
|---|---|---|
| Yaw Control | Ulat_Ped | LQR stabilization |
| | Yaw_Act_Cmnd | Classic guidance system |
| | Psi_Cmnd_Ped | Steady state trim search for $\psi$ |
| | Pedal_Trim | Initial trim pedal value |
| Roll Control | ULat_Lat | LQR stabilization |
| | Roll_Act_Cmnd | Classic guidance system |
| | Phi_Cmnd_Ped | Steady state trim search for $\phi$ |
| | v_Cmnd_Lat | steady state trim search for v |
| | Lateral_Trim | Initial trim lateral value |
| Longitudinal Control | ULong_Long | LQR stabilization |
| | Pitch_Act_Cmnd | Classic guidance system |
| | Theta_Cmnd_Long | Steady state trim search for $\theta$ |
| | w_Cmnd_Ped | Steady state trim search for w |
| | Long_Trim | Initial trim longitudinal value |
| Collective Control | Ulong_Coll | LQR stabilization |
| | Coll_Act_Cmnd | Classic guidance system |
| | Theta_Cmnd_Long | steady state trim search for $\theta$ |
| | z_Cmnd_Long | Steady state trim search for z |
| | Coll_Trim | Initial trim collective value |

With this separation of control inputs, each controller has its own objectives. Aircraft control is simplified and special maneuvers are now possible.

Algorithm of LQR Gain Scheduling Values

Stabilization and guidance of fixed wing aircraft or helicopters just using one feedback is difficult at best and may take a significant amount of time to find a proper feedback gain that can control the system within a small region. To avoid searching the right gains per phase margins and gain margin from classic feedback control laws, gain schedule method calculated from LQR is applied to save this effort. It is shown that the feedback gains generated from LQR always provide the best performance because it minimizes an energy cost function. In addition, all eigenvalues will be shifted to the desired region, and the guidance law gain scheduling can be avoided. Plotting various eigenvalues, eigenvectors, and damping ratios with respect to their various airspeeds will allow the designers to find a stable belt region in the global region for the system.

In order to complete this kind of task, the system needs to be divided into several segments. In this application, the open loop system is separated into several segments per airspeeds at hover, 10 knots, 20 knots, etc. LQR control gains generated from these airspeeds can be specified per formulations from the Improved LQR discussion above. In order to ensure all gain schedule values of the closed loop eigenvalues generated from these LQR methods will be within the best stable and performance region, eigenvalues, eigenvectors, and damping ratios of all three LQR closed loop systems are employed to complete this evaluation and investigation. The following algorithm is employed to complete this search:

a) Obtain LQR feedback for airspeed=0, 10 and 20 knots, etc.
b) Compute eigenvalues, eigenvectors and damping ratios of closed loop systems from Step a) for all cases.
c) Check eigenvalues, and ensure they are all stable.
d) Check open loop eigenvalues and closed loop eigenvalues, and ensure that the closed loop eigenvalues did not be move too far away from their open loop eigenvalues.
e) Check eigenvectors, and ensure the directions of all three are the same direction and within a tolerance, $\Delta$. The formulation of this tolerance will be discussed in equation (10) below.
f) Check all damping ratios, and ensure they are all damping ratios greater than 0.5.
g) If Steps a) thru f) are satisfied, stop and set these feedbacks as gain schedule values, which will provide the system is not only stable but also has very good performance.
h) If Steps a) thru f) are not satisfied, adjust LQR weighting matrices until Steps a) thru f) are satisfied.

The eigenvector tolerance, $\Delta$, shown in Step e) is formulated as $$\Delta_{0 \to 1} = \|v_0 - v_1\| \leq \kappa \|\lambda_1 - \lambda_2\| \quad (10)$$

where $v_0$ and $v_1$ are related individual eigenvectors from airspeed at hover and 10 knots, $\lambda_0$ and $\lambda_1$ are its eigenvalues, and constant value, $\kappa$, depends on fast mode or slow mode of the system. For fast eigenvalues, since absolute eigenvalues of fast mode are much larger than that of the slow mode, $\kappa$ is set to be $0.2\|\lambda_f\|$ and $\kappa$ is set to be $0.5\|\lambda_s\|$ for the slow mode. With these settings, the changes of eigenvector and eigenvalue set will be limited within the desired paths and values. Therefore, these eigenvectors and eigenvalues can be used for gain scheduling to keep the aircraft flight within desired performance.

Steady State Trim Search and Control Laws

In order to save control effort for the system, the second loop, steady state trim search control laws, is applied.

It is assumed that in the state space nonlinear region, there is a set of steady state values, which will make the system to have 1) Altitude rate, $\dot{h}$, close to zero for level flight or a constant value for steady state climbing.
2) Roll rate, $\dot{p}$, close to zero for level flight or a constant value for level turn in higher airspeed.
3) Yaw rate, $\dot{r}$, close to zero for level flight or a constant value for level turn in lower airspeed.

The objective of steady state trim search control laws is to find a set of feedback controllers such that the aircraft will follow the steady state trim values to automatically catch the trim flight. For example:

Steady state level flight
Steady state coordinated turn
Steady state climbing while airspeed is fixed
Steady state increasing airspeed while altitude is held.

If the aircraft satisfies this kind of trim flight, the control after each guidance function or during the guidance function will always follow the steady state trim value flight. This implies that the system will save its control efforts during the above flights, since the system does not need to waste any control effort to hold extra forces or moments for altitude, airspeed, or angle of attack, or roll angle, or side slip angle, etc.

In order to achieve the above goals, a LQR model technique with command generator method is applied. However, instead of using a differential equation as command generator, the steady state trim value with its initial trim condition is employed as the command generator in the invention. The difference between current flight state, steady state trim value and initial trim condition is set to be the tracking error, which is minimized or reduced to zero while in the steady state condition.

Figure 7:
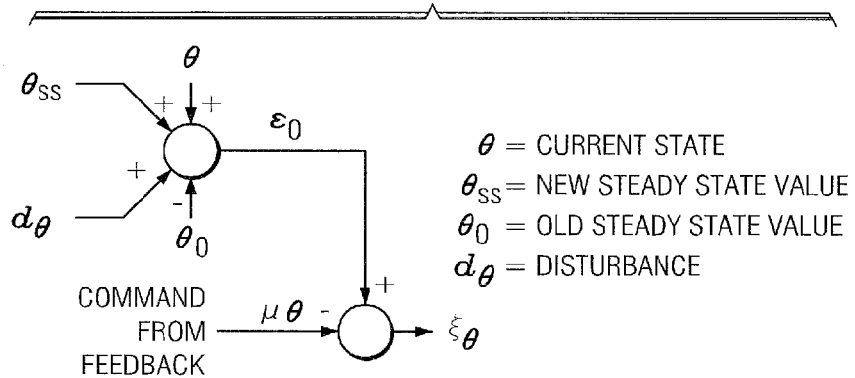
FIG. 7 is a schematic view of the pitching angle steady state trim control law according to the present invention.

FIG. 7 illustrates the pitching angle steady state trim control law. The original initial trim condition is $\theta_0$, the desired steady state trim value from aerodynamic analysis is $\theta_{ss}$, and the total pitching angle error per time step in the system will be $\theta_{err}$. Note that the system disturbance rejection design is also included in this diagram, denoted as $d_\theta$. A feedback command generator is used to provide the necessary control effort to move initial trim to steady state trim.

It is denoted that all initial trim values are evaluated for trim search control technique. These steady state trim values are transferred to a gain schedule table based on various airspeeds, and an example table is shown in Table III.

TABLE III

Example helicopter trim table

| State | Airspeed | Value | Feedback Controller |
|---|---|---|---|
| v | Hover | 0 | Roll actuator |
|  | 40 Knots | −0.0690 |  |
|  | 80 Knots | −0.1970 |  |
| w | Hover | 0 | Collective actuator and pitch actuator |
|  | 40 Knots | 2.170 |  |
|  | 80 Knots | 5.425 |  |
| θ | Hover | 1.5930 | Collective actuator and pitch actuator |
|  | 40 Knots | 1.7130 |  |
|  | 80 Knots | 2.3040 |  |
| φ | Hover | −3.3630 | Roll actuator |
|  | 40 Knots | −1.9460 |  |
|  | 80 Knots | −2.0760 |  |
| ψ | Hover | 0 | Yaw actuator |
|  | 40 Knots | 0 |  |
|  | 80 Knots | 0 |  |

To make the system performance follow steady state reference, the tracking error will satisfy:

$$\epsilon_\theta = (\theta_{ss} + \theta - \theta_0) + d_\theta \quad (10)$$

When transfer function of (11) applies for command generator, the modified tracking error equation will be transformed to $$\epsilon_0 = \xi_\theta - \mu_\theta \quad (11)$$

where $\epsilon_\theta$ is the modified tracking error with respect to pitching angle, $\theta$. It is assumed that the command generator is of the form of closed loop aircraft system as $$\dot{X}_\mu = A_c X_\mu + B_\mu \mu$$

$$Z_\mu = H_\mu X_\mu \quad (12)$$

where $X_\mu$ and $Z_\mu$ are steady state search state and output variables. Note that 0 is just one of performance outputs for example. It is very important to know that the command generator model is selected very close to the closed loop system of aircraft, where $A_c$ is re-grouped from $$A_c^{Long}=A-B_{long}R_{long}^{-1}B_{long}^T P_{long} \text{ and } A_c^{Lat}=A-B_{lat}R_{lat}^{-1}B_{lat}^T P_{lat} \qquad (13)$$

Closed loop eigenvalues of (13) are all stabilized from the inner loop equations.

Combination of the state equation and command generator results in $$\dot{\overline{X}} = \begin{bmatrix} \dot{X} \\ \dot{X}_\mu \end{bmatrix} = \begin{bmatrix} A_c & 0 \\ 0 & A_c \end{bmatrix} \cdot \begin{bmatrix} X \\ X_\mu \end{bmatrix} + \begin{bmatrix} 0 \\ B_\mu \end{bmatrix} \cdot \mu = \overline{A}_c \overline{X} + \overline{B}_\mu \mu \qquad (14)$$

The command generator along with LQR design is used to achieve the steady state loop design. It is assumed that the command generator control input satisfies the following differential equation:

$$\dddot{\mu}+a_1\ddot{\mu}+a_2\dot{\mu}+a_3=0 \qquad (15)$$

Therefore, its characteristic polynomial will be $$f_\mu(s)=s^3+a_1s^2+a_2s+a_3 \qquad (16)$$

Note that eigenvalues of the above characteristic polynomial are pre-selected to be very stable.

Multiplying (14) by $f_\mu(s)$ (16) and assuming $$\xi = f_\mu(s)\overline{X} = \dddot{\overline{X}} + a_1\ddot{\overline{X}} + a_2\dot{\overline{X}} + a_3\overline{X} \qquad (17)$$

$$\eta = f_\mu(s)\mu = \dddot{\mu} + a_1\ddot{\mu} + a_2\dot{\mu} + a_3\mu \qquad (18)$$

results in $$\dot{\xi} = \overline{A}_c \xi + \overline{B}_\mu \eta \qquad (19)$$

Therefore, the modified tracking error on (11) can be transformed to $$f_\mu(s)\cdot\epsilon=[-C\ C]\cdot\xi=\overline{C}\xi \qquad (20)$$

where C is the matrix represented from the state and its trim variables and $\epsilon$ are all modified tracking errors. Therefore, this error motion can be represented in the following canonical form $$\dot{\varepsilon} = \begin{bmatrix} 0 & 1 & 0 \\ 0 & 0 & 1 \\ -a_3 & -a_2 & -a_1 \end{bmatrix} \cdot \varepsilon + \begin{bmatrix} 0 \\ \overline{C} \end{bmatrix} \xi = F\varepsilon + G\xi \qquad (21)$$

$$e = [1\ 0\ 0]\cdot\varepsilon$$

In order to achieve small error guidance without using too much control energy, state and command generator equations (19-20) are augmented with the above error representation (21) as:

$$\begin{bmatrix} \dot{\varepsilon} \\ \dot{\xi} \end{bmatrix} = \begin{bmatrix} F & G \\ 0 & \overline{A}_c \end{bmatrix} \cdot \begin{bmatrix} \varepsilon \\ \xi \end{bmatrix} + \begin{bmatrix} 0 \\ \overline{B}_\mu \end{bmatrix}\cdot\eta = \hat{A}_c \begin{bmatrix} \varepsilon \\ \xi \end{bmatrix} + \hat{B}\eta \qquad (22)$$

In order to transform the above problem into LQR design, the cost function of the above system is designed as $$J_{\varepsilon-\xi} = \frac{1}{2}\int_0^\infty \left\{ [\varepsilon\ \xi]\cdot Q_{\varepsilon-\xi}\cdot\begin{bmatrix}\varepsilon\\\xi\end{bmatrix} + \eta^T\cdot R_{\varepsilon-\xi}\cdot\eta \right\}dt \qquad (23)$$

where $$Q_{\varepsilon-\xi} = \begin{bmatrix} I & 0 \\ 0 & \overline{C} \end{bmatrix}^T \begin{bmatrix} I & 0 \\ 0 & \overline{C} \end{bmatrix} \text{ and } R_{\varepsilon-\xi} = I \qquad (24)$$

Therefore, the solution of the control system will have the optimal tracking error controller as $$\eta = -\hat{B}^T K_{\varepsilon-\xi}\begin{bmatrix}\varepsilon\\\xi\end{bmatrix} \qquad (25)$$

where $K_{\varepsilon-\xi}$ is the solution of the following Riccati equation $$\hat{A}_c^T K_{\varepsilon-\xi}+K_{\varepsilon-\xi}\hat{A}_c+Q_{\varepsilon-\xi}-K_{\varepsilon-\xi}\hat{B}_{\varepsilon-\xi}R_{\varepsilon-\xi}^{-1}\hat{B}_{\varepsilon-\xi}K_{\varepsilon-\xi}=0 \qquad (26)$$

Figure 8:
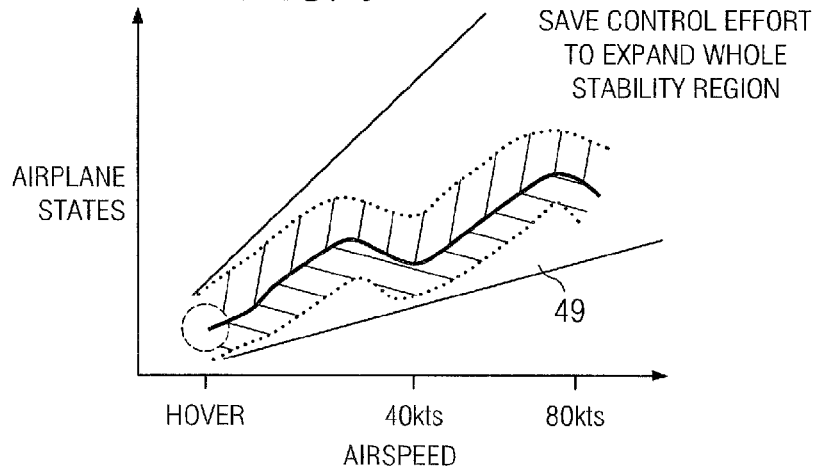
FIG. 8 is a graph showing aircraft states plotted against airspeed for a system according to the present invention, the graph showing the enlarged stability from use for the trim search method.

The above Riccati equation provides positive definite symmetric solution, because the system is stabilized first for all models. In addition, the model is from a canonical form of the error tracking polynomial. Therefore, the second LQR increases stability of the system not only in steady state trim but also in control authority and disturbance rejection in the loop. This is shown in FIG. 8 as wedge-shaped stability region 49.

Note that the above calculation can be simply programmed into the software as long as the original closed loop system is determined from the search routine in the inner loop. Therefore, the program to design the steady state search loop is interconnected with respect to the search routine in the inner loop to perform all at the same time, reducing the required engineering time in computing these.

Outer Loop Classic Guidance Design

This present invention improves the design of a flight guidance system (FGS) using classic feedback loop on the outer loop of the system. Both military and commercial requirements, as well as regulatory agencies, are considered, and customer inputs and Federal Aviation Administration (FAA) regulatory data are assumed to be pre-required and shall be considered in the design of flight guidance control systems.

Adjustment of individual control gain is dependent on its relative aerodynamic coefficients and associated control gains. The rules of adjusting these gains are not fixed. In order to correctly adjust these gains, several rules are needed so that the same mistakes are not repeated each time in the classic feedback guidance design. Since the inner loop LQR gain schedule design has stabilized the closed loop system, classic feedback control laws are mainly for guidance purpose. Of course, if the classic feedback laws will increase the stability of the system while performing very good guidance function, this kind of classic feedback control laws will be considered first. However, it has been observed that in high-speed flight conditions there are very few control gains that will make the system stable without employing LQR gains.

Since the closed loop is stable, adjustment of classic feedback gains can be simplified to emphasize increased guidance power. It has been determined that adding all their related gain values together and multiplying with a summary gain can increase guidance performance. This way of implementation may not work by the pure classic feedback control laws, but this method is one of the powerful initiations in guidance system with the present LQR design.

The methods of how to adjust these gains will be analyzed and discussed below per importance of individual block based on military or FAA requirements.

Directional and Lateral Guidance Control

Lateral path control can be accomplished over the full flight envelope of any conventional helicopter or airplane through roll attitude commands alone. Depending on forward speed and the nature of the yaw axis, commanded roll attitude will result in a heading rate for cruise flight or sideslip for hover or low speed flight. For aircraft equipped with direct lateral thrust control capability, low speed guidance performance will be highly enhanced through the proposed method.

Heading Control

For cruise flight, desired heading can be captured and tracked through roll attitude commands proportional to the heading error. The heading reference is typically provided from a selector knob on the FGS control panel. Heading error scheduled gain could be avoided as a function of true airspeed or groundspeed from the above LQR method. Therefore, it will become very easy to maintain an approximately constant ratio of commanded turn rate to degrees of heading error. No additional damping terms will be required using the proposed method. Important features of a heading select control system include attitude command limits for consistent maximum turn rates (standard rate is typical) and simplified command rate limiting and filtering for optimum ride qualities.

Figure 9:
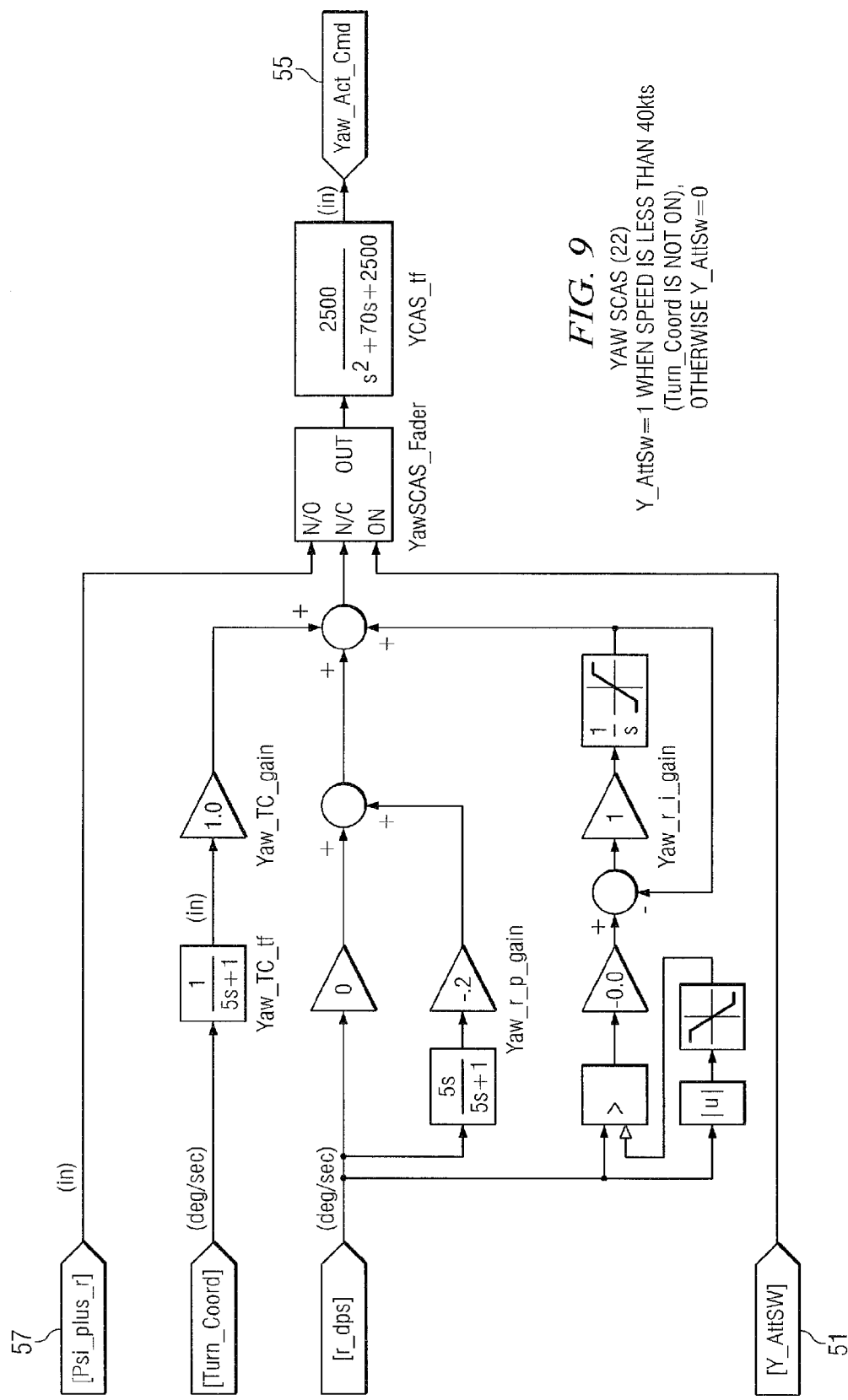
FIG. 9 is a schematic view of a portion of the system of FIG. 1.

FIG. 9 is a diagram of the YawSCAS [(22) in Table i] and shows the potential of yaw heading guidance control during low speed flight. The yaw guidance for fast speed and lower speed in the figure is determined by a switch called Y_Attsw 51. When Y_Attsw 51 logic is true, it is assumed the aircraft is at a low airspeed. Therefore, turn coordinate function is off. The guidance system to make aircraft turn will mainly contribute from yawing control instead of rolling. In other words, the rolling command will pick up.

Figure 10:
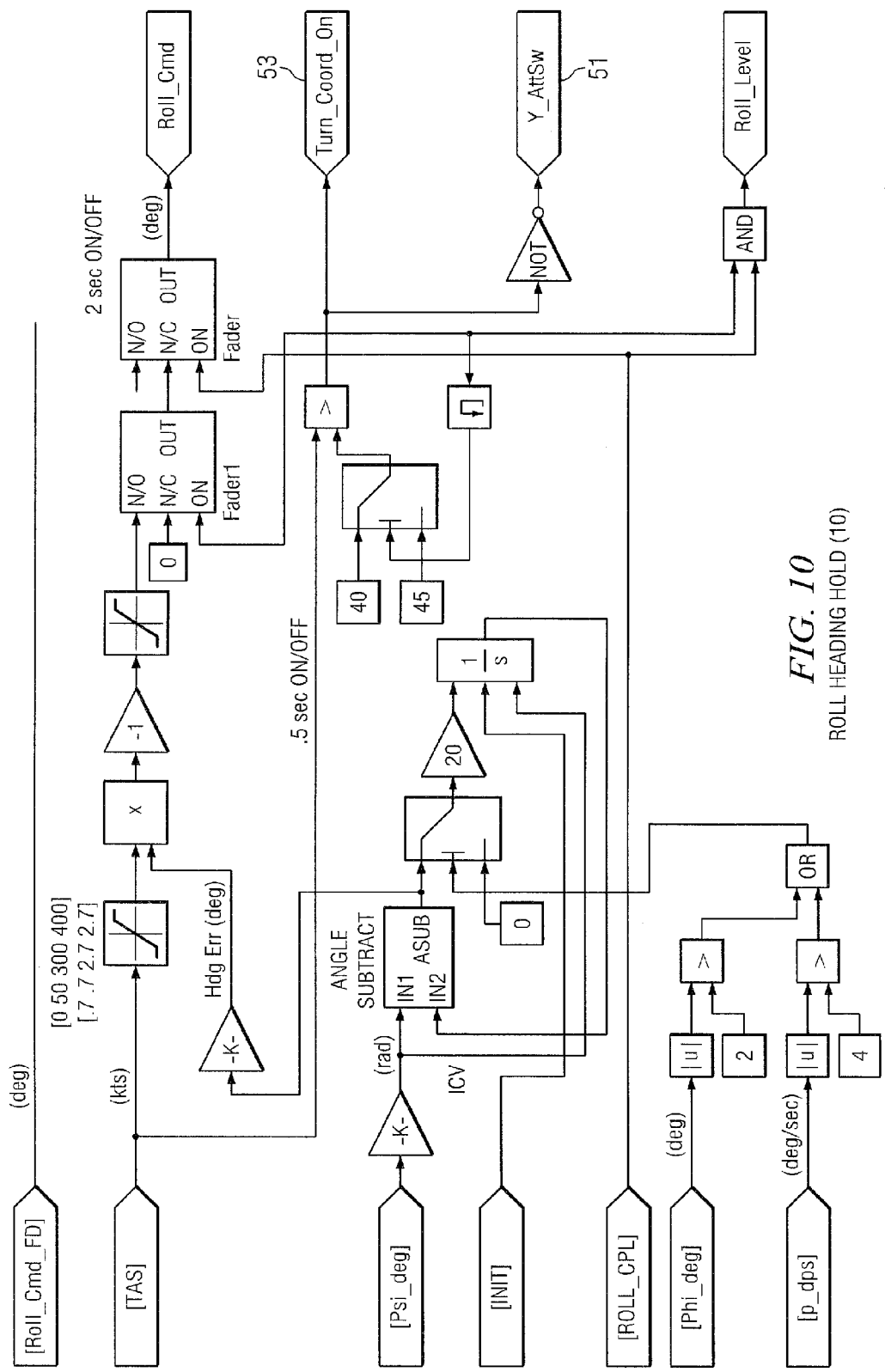
FIG. 10 is a schematic view of a portion of the system of FIG. 1.

This switch on or off is determined by a signal called Turn_Coord_On 53 which is shown in FIG. 10 on the diagram for RollHdgHold [(10) in Table I]. Determination of switching on-off Turn_Coord_On 53 is dependent on the true airspeed (TAS) logic shown on RollHdgHold (10) diagram. When TAS is between 35 and 40 knots, the system is on a hysteresis loop, depending on whether airspeed is decreasing or increasing. Yaw heading control in low speed is assumed that TAS is lower than 40 knots, which refers that Turn_Coord_on=0, and Y_Attsw=1.

Since improved LQR method has shifted all eigenvalues to the desired positions, the control gains used in this diagram are fixed and gain scheduling is avoided. In addition, all employed gain values have a ratio between 1/10 and 1/4. Again, this helps a designer to save time in adjusting these gains in the flight field.

Figure 11:
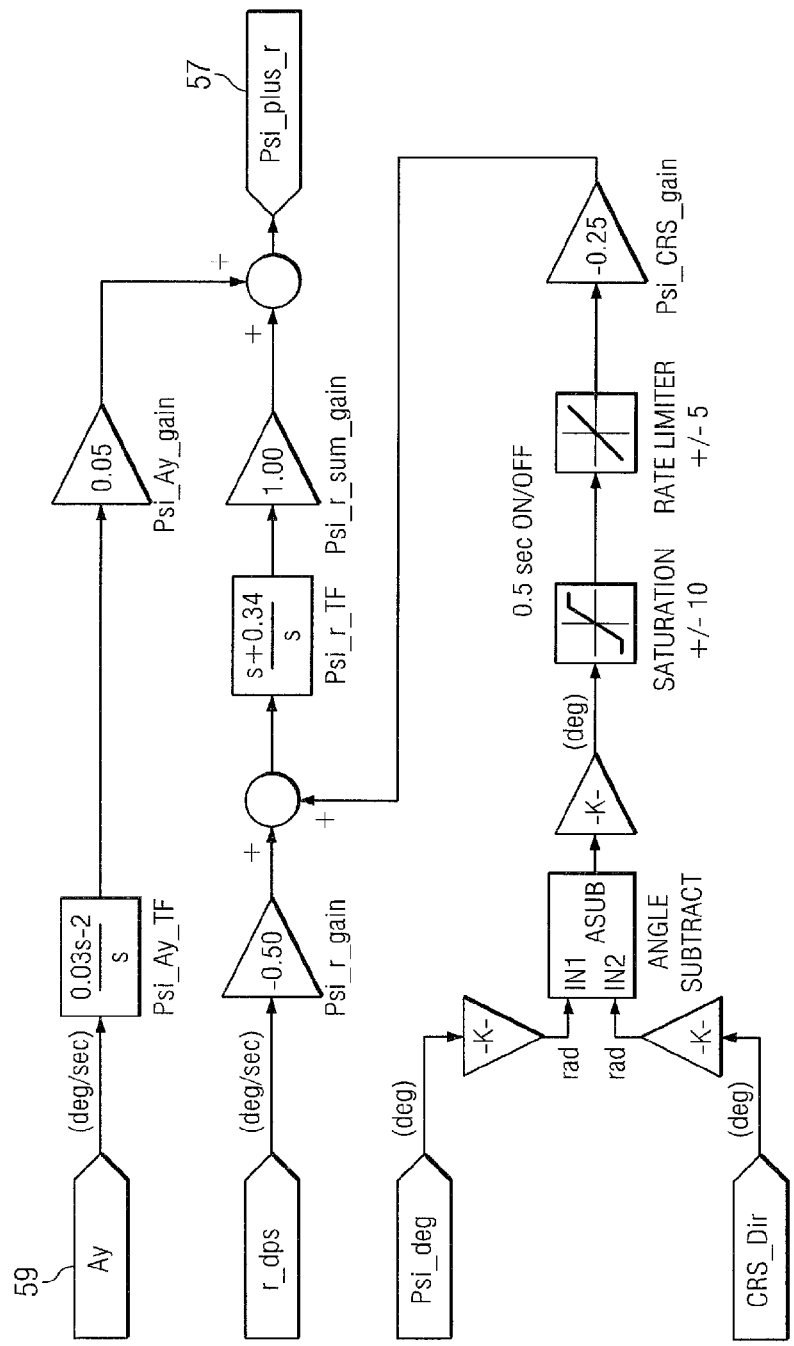
FIG. 11 is a schematic view of a portion of the system of FIG. 1.

When Y_Attsw=1, Yaw_Actr_Cmnd 55 (FIG. 9) gets its value from Psi_plus_r 57, the value of which value is determined by YawOuter [(23) in Table I]. The diagram of YawOuter (23) is shown in FIG. 11. All gains on the YawOuter (23) diagram need to be pointed to the correct direction so that Yaw in the low speed region will be guided.

The first gain value discussed here is Yaw_Ay_Gain 59. Without Yaw_Ay_Gain 59 feedback, the system will diverge (during steady state turn or circle mode) when LQR Yaw Feedback control is not used. The sum of Ped_control will be very hard to keep in the unchanged value (zero). Usually, this gain value is set to be positive 1/10 to 1/4 of Psi_r_Gain 57 value.

Lateral Navigation Control

Lateral path guidance to a VOR or Localizer navigation source is accomplished by feeding back lateral deviation (cross-track error) into a heading-stabilized roll control loop. Here, the heading reference is the desired course to be followed. The angular VOR deviation signal should be converted to pseudo-linear cross track distance by use of DME or other appropriate estimate of distance to the transmitter. Localizer deviation may be linearized by use of radar altitude whenever glideslope control is concurrent, with maximum usable sensitivity being dependent on sensor noise content. Use of supplementary sensors (inertial, air data, e.g.) as available without complementary or optimal state filtering is highly admissible with the present design. When the navigation system is expected to overfly a VOR station, the system design should include an automatic dead-reckoning mode to take over when the indeterminate area of coverage ("zone of confusion") is encountered. Of particular importance in a lateral path guidance implementation is the capture sequence. Unlike pure classic feedback system, the proposed design can be automatically held in heading select mode.

FMS Navigation Control

Off-the-shelf Flight Management Systems (FMS) typically provide a pre-processed "composite" roll attitude steering output, which supplants the necessity for detailed control law implementation in the FGS. However, the adequacy of such commands can be avoided for the intended application, in particular where the steering output may have been tailored to a different class of aircraft or speed envelope. Limiting and filtering characteristics of the composite command should be examined for suitability to the application and supplemented in the FGS as necessary.

Lateral Go-Around Function

Lateral Go-Around (also sometimes referred to as Missed Approach or Egress) for the lateral axis consists of establishing a suitable lateral path or heading for exiting the landing area. Typically, maintaining heading existing at engagement is considered acceptable. Subsequent turning to the preset missed approach heading is typically accomplished by engagement of the heading select mode at pilot option. With the present invention, the lateral heading will preferably be automatically engaged when mission is missed.

Vertical Guidance Control

Guidance of the vertical flight path of a helicopter or VTOL aircraft, such as a tiltrotor, is accomplished through pitch attitude or power commands, depending on the flight regime. At cruise speeds, climbs and descents are best achieved by changes in pitch attitude, whereas at low speeds (below Vy), control can only be affected through power (vertical thrust) changes. Depending on the application and cost goals, a thrust axis can be implemented automatically so that the coupling effect from lateral and longitudinal motions as well as disturbance can be reduced to minimum.

The vertical FGS are designed to provide a smooth transition between control strategies at the appropriate airspeed (or other parameter, such as thrust angle, as applicable). Barometric vertical velocity, preferably complemented with inertial vertical velocity or acceleration, typically forms the basis of all vertical path control modes. Path errors (altitude, glide slope, etc.) are closed around this inner loop, thus providing a vertical velocity reference or command. The percentage of accuracy of vertical flight path capture can be reached to 99.9 in the present invention. This is attributed to separation of control law design in helping guidance accuracy.

Vertical Velocity Control

Implementation of vertical velocity select/hold mode requires the generation of a vertical velocity error feedback comprised of the difference between a reference and vertical velocity for climb and descent commands. The reference is preferably supplied by a selector knob (or wheel) located on the FGS control panel or through a "beep" switch located on a control stick grip (preferably the power lever) that slews a reference integrator within the FGS. Rate and magnitude limits are designed on the reference consistent with the maneuver limits desired. Synchronization of the reference to existing vertical velocity will be engaged automatically. The accuracy of vertical velocity synchronization is higher than 99 percent by using the method of the invention.

Altitude Control

Implementation of altitude control modes consists of generating a reference altitude, subtracting this reference from existing altitude, and providing the error as a reference (command) to the vertical velocity control loop. Altitude hold mode will store the value of altitude existing at engagement as the reference. Altitude pre-select mode employs the reference to be supplied externally, usually from a knob on the FGS control panel or the altitude instrument panel display. The method for implementing pre-select control is to arm the mode and continue in a climb/descent mode (vertical speed e.g.) until the selected altitude is neared. An asymptotic capture is automatically programmed as a function of altitude closure error, followed by automatically switching to altitude hold. Maneuver limiting provisions for vertical speed mode is applied for altitude control as well, except more restrictive limits on maximum allowable vertical speed may be appropriate.

Vertical Glideslope Capture

Implementation of a glideslope control law is similar in structure to altitude hold, although somewhat higher tracking gains are desirable. For conventional ILS systems, which provide angular deviation signals, conversion of the errors to linear displacement is needed, typically using radar altitude to estimate distance from the transmitter. Since staying on the glideslope requires maintaining a descent rate, the vertical speed command includes a down command bias based on horizontal speed so that no steady state glideslope error will be required to achieve the descent. As in lateral navigation, the capture sequence is designed to produce an asymptotic acquisition of the beam without overshoots or undershoots.

Vertical Transition-to-Hover

Approach to hover in the vertical axis consists of setting up a controlled descent to the desired radar altitude. The descent angle is dependent on operational requirements, with approximately six degrees being typical for helicopters or tiltrotor aircraft. The altitude rate reference is computed based on horizontal ground speed to achieve a constant angle glide path, concluding in a closed loop flare to the established height above ground or water. Capture and track of the final altitude is similar to that used for altitude select/hold. Radar altitude can be complemented with inertial vertical acceleration or velocity to eliminate effects of noisy signals and/or terrain variations.

Vertical Go-Around

Vertical go-around mode consists of establishing a climb rate that is sufficient to exit the landing area in a safe manner. A fixed vertical velocity reference is usually sufficient, with 750 ft/min being typical. If the mode is engaged at speeds below Vy, the command will need to be delayed. However, it has been ensured that the desired climb angle can be achieved and maintained without exceeding power limits programming horizontal speed to the system.

Longitudinal Guidance Control

Longitudinal guidance consists of controlling airspeed or groundspeed along the x-axis of the vehicle. Like the vertical axis, control is usually through pitch attitude or power commands, depending on flight condition. At speeds below Vy, speed control is typically accomplished by commanding pitch attitude changes. Thrust vector angle or direct longitudinal thrust modulation (if available) are also effective for low speed control. At cruise, power modulation is effective for maintaining desired speed. Transition between control strategies is linked with the vertical axis, exchanging between pitch and power control simultaneously for both longitudinal and vertical modes.

Airspeed/Ground Speed Control

Implementation of speed select/hold mode requires the generation of a velocity error feedback comprised of the difference between a reference and current speed to provide accelerate or decelerate commands. For airspeed control, pitot-derived airspeed is complemented with inertial longitudinal acceleration. Depending on vehicle characteristics, a moderate level of acceleration feedback is employed to attain desired stability levels. The reference is supplied by a selector knob located on the FGS control panel, or through a beep switch located on a control stick grip (preferably the cyclic stick), which slews a reference integrator within the FGS computations. The reference is rate and magnitude limited consistent with the maneuvering limits desired. With this design, the accuracy of airspeed control is higher than 99 percent.

Longitudinal Transition-to-Hover

Automatic approach to hover in the longitudinal axis is implemented by controlling groundspeed in a predetermined manner. If termination of the approach is to be at a specific (geographic) position, distance to the hover point is used to control the deceleration initiation and magnitude such that zero velocity is reached simultaneously with zero distance. The speed reference is commanded at a rate consistent with the desired maximum deceleration rate (typically 1 to 2 knots/second). If the hover point is not specific, the pilot can initiate the approach at any time, whereupon the velocity reference is commanded to zero at a constant rate, again consistent with the desired maximum deceleration rate.

Longitudinal Go-Around

Go-Around in the longitudinal axis is implemented by commanding a controlled acceleration to the optimum climb speed. The controlled parameter may be either groundspeed or airspeed as appropriate for the particular approach mode being aborted. All control law parameters established for speed control and transition to hover are also applicable to go-around.

Discussion and Results

In the old classic feedback control laws, proportional-integral-derivative (PID) method is applied to not only control the aircraft but also stabilize the system. Feedback to the individual performance may repeatedly be employed for the other performance to achieve stabilization, guidance and navigation. Since integral gains are used, washout out functions and limiter release logics are necessarily employed to avoid control surfaces quickly hitting their detent values for protections. Therefore, in military specification, as long as frequencies of slow mode eigenvalues is very slow, negative damping ratios are under certain values, the system can still exist in the old classic feedback control laws design. When asking for precision control, the ability of this kind of control method may or may not achieve this goal, depending on aircraft's structural and aerodynamic design.

The proposed method is to employ the other two assistances from LQR to allow the aircraft system to achieve precision control even that the open loop system is not within military category. Therefore, the trim condition, disturbance rejection and handling qualities scale ratio can all be considered as requirements in this three loop control laws design.

Therefore, the performance in guidance, navigation and stability are extremely improved.

Improved LQR Method

The advantages of proposed method in improved LQR:
1. Shift all closed loop eigenvalues and eigenvectors to the desired positions and directions for all models from k=0, 1, 2 . . . , or j. Therefore, all characteristics of individual states will perform similarly.
2. All gain values are pre-programmed using search algorithm. The engineering time of searching all gains will be reduced. The time to switch to another set of gains values is also shortened.
3. It will ensure that the closed loop eigenvalues and eigenvectors are all located on handling quality level scale 1.
4. Since all gains from improved LQR are stabilized, simplified classic guidance law will not need to do the gain adjustment or gain scheduling any more.
5. Simplified classic feedback gain can be used for all models in guidance loop.

Steady State Search Method

The advantages of proposed method in steady state search method:
1. Allow the aircraft to fly the natural trimmed conditions at all times. Therefore, the additional control authority that would be used for balancing trim values can be reserved.
2. Since no zeros at the poles of disturbance rejection model are in the search method, a certain degree of disturbance rejection is achievable.
3. Simultaneously achieving guidance, navigation, stability, and control of aircraft under the optimal performance with disturbance rejection. Therefore, the accuracy of guidance functions is extremely improved.

Classic Guidance System

The advantages of the methods of the invention in classic feedback method:
1. The feedback states for certain functions in guidance loop can be eliminated. Since LQR has stabilized the closed loop system, the old classic feedback states to make the system stabilized can be eliminated. This will simplify the guidance loop to be more concise.
2. This loop will ensure the aircraft follows the best trim condition on all necessary maneuvers.
3. This loop will increase the control authority for all other loops.
4. This loop will increase aircraft stability in steady state level flight.
5. This loop will help to steady state error correction.

Simulation Results

Figure 12:
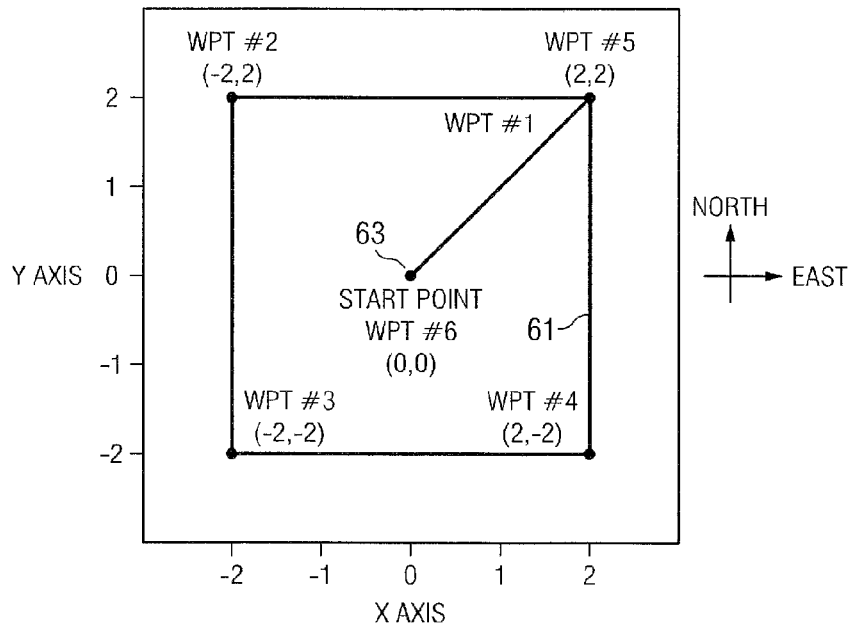
FIG. 12 is a plot showing an example of a square flight path used in simulations using the system according to the present invention.

UAV simulation results are employed to illustrate the potential of the proposed system of the invention. FIG. 12 shows a square flight path 61 used in the simulation. This type of flight path might be used for a rescue searching function or similar mission. The aircraft flies from waypoint #1 at origin 63 [located at (0,0)], then sequentially flies to waypoints #2, #3, #4, and #5 on the perimeter of flight path 61 before returning to waypoint #6, which is also at origin 63. In the simulation, when the aircraft flies to each waypoint, it will transform its flight on the waypoint to a circle mode until the ground station ensures that no victim is located near that waypoint.

Figure 13:
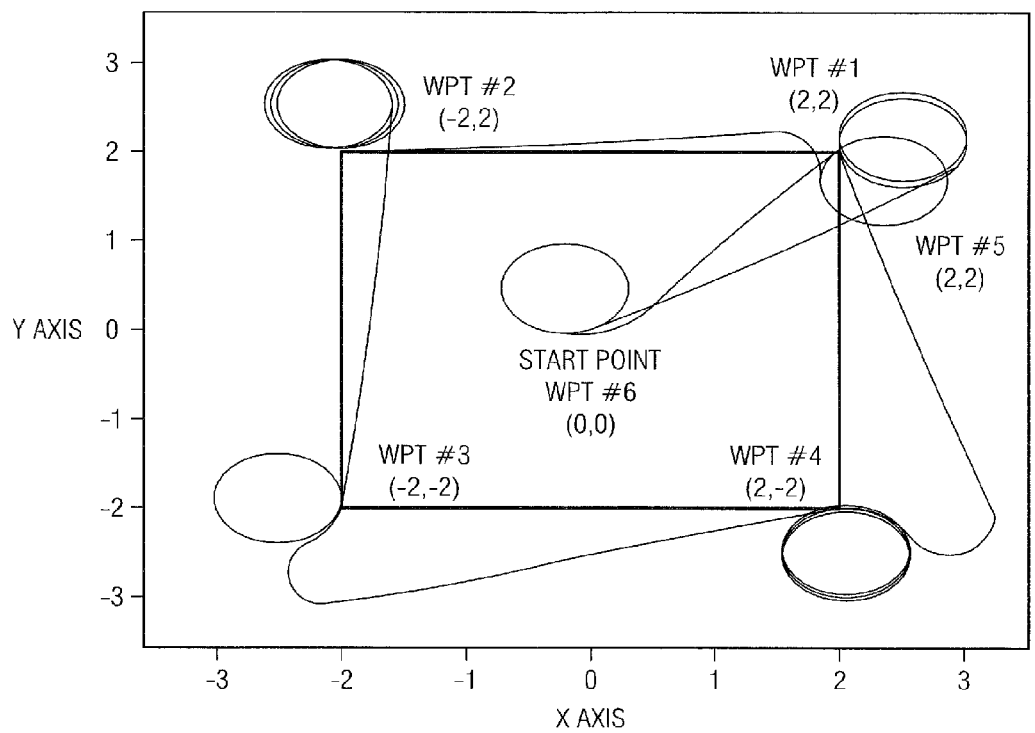
FIGS. 13 through 16 are plots showing the simulated flight of an aircraft using the system according to the present invention and following the flight path of FIG. 12.
Figure 14:
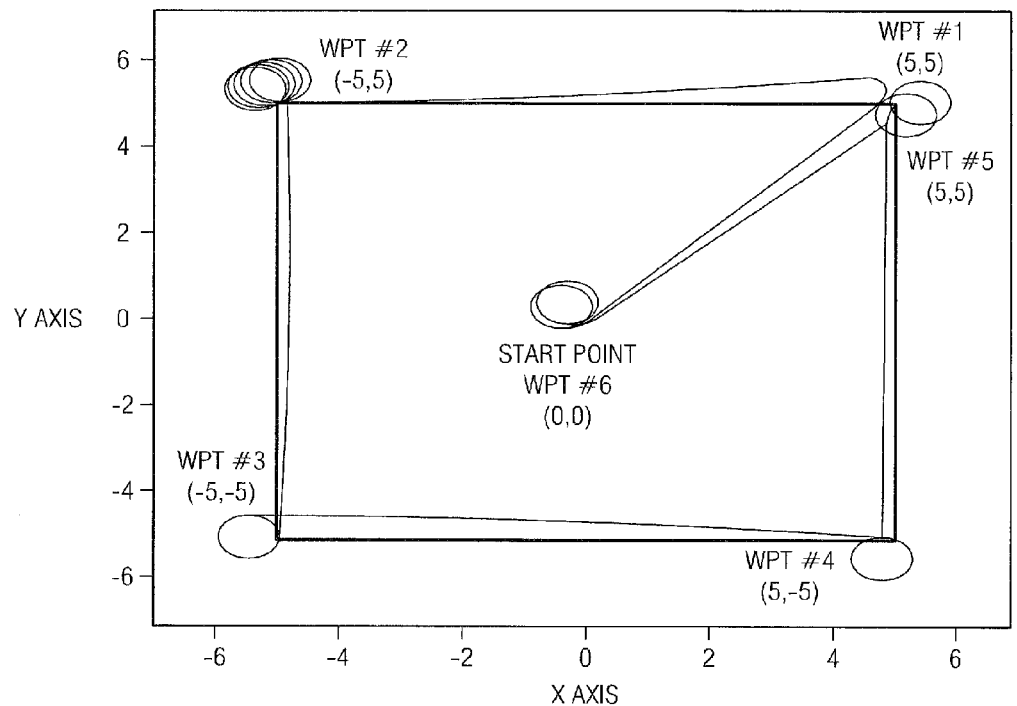
Figure 15:
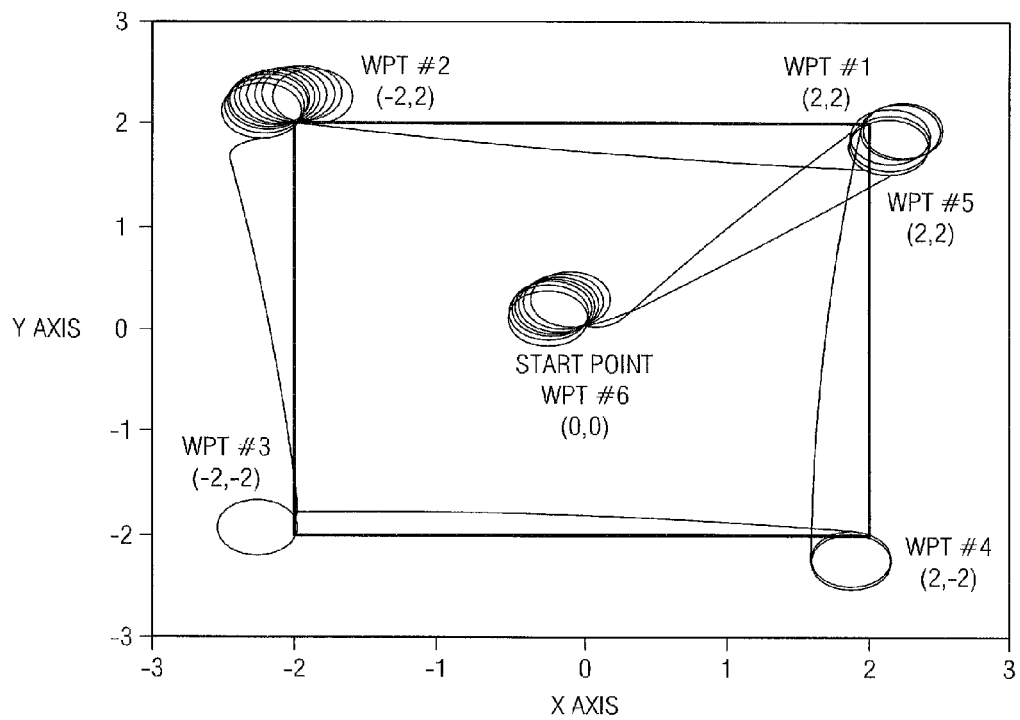
Figure 16:
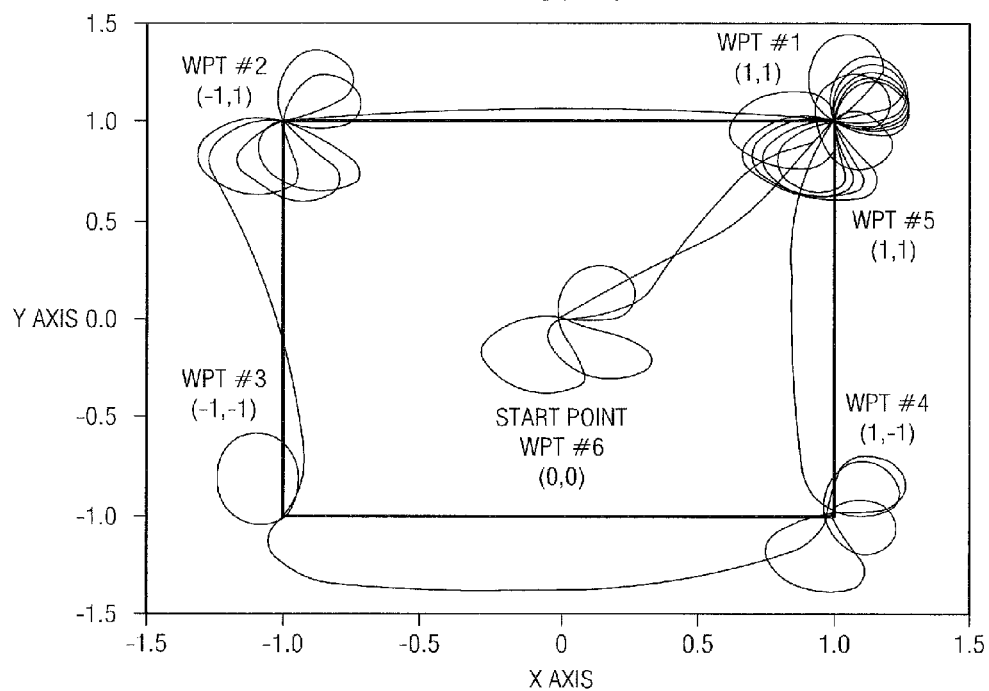

UAV simulation results are shown on FIGS. 13, 14, 15 and 16 for different searching speeds and searching square sizes. FIG. 13 shows the results of a flight at 80 knots around a flight path 4 miles on each side, FIG. 14 shows the results for a flight at 65 knots around a flight path 10 miles on each side, FIG. 15 is for 45 knots around a 4-mile square, and FIG. 16 is for 25 knots around a 2-mile square. Note that for airspeed higher than 40 knots, the turn coordinate function will be automatically turned on. Therefore, on each waypoint, circle mode will be performed until next waypoint is triggered. It is shown that UAV accomplishes its mission with higher than 99 percent accuracy of the waypoint capture on all six waypoints on all three cases where the airspeed is higher than 40 knots. Furthermore, the circle function is very well performed on each waypoint. Note that when flying circle mode, the aircraft altitude is also moving up and down to allow version system to explore any angle around the search region. Even with control surface changes in the vertical portion, the UAV still shows very positive flight. All guidance gains employed to accomplish the above flight are not gain scheduling, which means they are not changed. Therefore, it can be observed that gain-scheduling function is avoided on the guidance loop.

Note that disturbance model is also added in the simulation system. When moving wind disturbance up to 10 knots on x and y directions, the aircraft is still performing very robust. Even with wind disturbance being increased to as high as 25 knots, the aircraft can still accomplish its mission without any, assistance from other control algorithm.

Pure classic feedback control laws are also investigated in this model. It is recognized that classic feedback control laws require immediate attention for waypoint capture, and it can lose its flight path very easily. Flight control surfaces can reach their limits very easily because the open loop of the selected aircraft model is very unstable. When classic feedback control laws are going to
(1) Stabilize the system,
(2) Do the guidance and navigation of aircraft, and
(3) As well as maintain natural flight trim conditions,
without gain scheduling, these functions become impossible. In addition, finding these gain values becomes time consuming and may not succeed.

The reasons for the proposed method easily accomplishing this mission are
1) Using three control loops to achieve its missions
2) Each loop performs its own best capability
3) Each loop will not affect other's performance
4) All closed loop eigenvalues from improved LQR method are located closely each other.
5) All close loop eigenvectors are having the same directions.
6) All trim values for search loop are from its natural performance.
7) Steady state error accumulation does not exist.
8) Classic feedback is for guidance purpose.

FIG. 16 illustrates the effects when the helicopter flies slower than 35 knots and the turn coordinate function is off. The circle function does not exist under this condition. When asking the helicopter to do the search function on each waypoint, the aircraft will either transfer this mode to circle mode or an 8 mode. However, in either mode of flight the aircraft maintains its waypoint capture and square search mission.

In an alternate embodiment of the present invention, two LQR's, or one LQR and one H-infinity control, or two H-infinity controls, are utilized instead of one LQR plus classic feedback. However, this alternate embodiment may have the following disadvantages: (1) increase complexity of approach; (2) visibility of simulation of the whole system may be lost; and (3) individual guidance control law may be lost. Nevertheless, the steady state trim search control law, which is not found in any other control system, is retained.

Inside the rotorcraft industry, the present invention could be used on all manned or unmanned helicopter to robustly enlarge flight stability and improve flight quality. Outside the rotorcraft industry, this invention can also be applied to the fixed-wing aircraft, unmanned aerial vehicles, submarine autopilot systems, and other control systems.

The present invention includes significant benefits and advantages, including: (1) increasing handling qualities and performance for piloted aircrafts; (2) increasing robustness for unmanned aircrafts; (3) reducing flight test time; (4) reducing flight control law development time; (5) providing for easily applied intelligent portion for unmanned control; (6) providing for the system to be easily understood and implemented by engineers; and (7) using all advantages from classic feedback and modern control methods and eliminating their disadvantages.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A flight control system for controlling the flight of an aircraft, the system comprising:
    an inner loop configured to stabilize the flight control system, the inner loop having:
        a control law;
        wherein the control law is separated into flow paths for a longitudinal component and a lateral component;
        wherein the longitudinal component includes a longitudinal motion input that passes to a longitudinal linear quadratic regulator and a first gain scheduling block, the lateral component includes a lateral motion input that passes to a lateral linear quadratic regulator and a second gain scheduling block; and
        wherein an output from the first gain scheduling block and an output from the second gain scheduling block are regrouped;
    an outer control loop utilizing a summary gain design to shorten a gain selection; and
    a steady state trim loop configured to automatically catch the trim flight of the aircraft.

2. The flight control system of claim 1, wherein the inner loop achieves stabilization through use of an optimal phase margin and gain margin.

3. The flight control system of claim 1, wherein the inner loop achieves stabilization through use of an optimal phase margin and gain margin and wherein the inner loop utilizes an algorithm based on eigenvalue, eigenvector, and dampening ratio from time to determine the optimal phase margin and gain margin.

4. The flight control system of claim 1, wherein the outer control loop automatically holds lateral path guidance in a heading select mode.

5. The flight control system of claim 4, wherein the inner control loop, the outer control loop, and the steady state trim loop are pre-programmed.

6. The flight control system of claim 1, wherein the steady state trim loop automatically searches for an optimal trim condition at any flight conditions.

7. The flight control system of claim 6, wherein the steady state trim loop searches for the optimal trim condition based on altitude rate.

8. The flight control system of claim 6, wherein the steady state trim loop searches for the optimal trim condition based on roll rate.

9. The flight control system of claim 6, wherein the steady state trim loop searches for the optimal trim condition based on yaw rate.

10. The flight control system of claim 6, wherein the steady state trim loop utilizes a linear quadratic regulator method with a command generator to determine the optimal trim condition.

11. The flight control system of claim 6, wherein the steady state trim loop utilizes a linear quadratic regulator method with a command generator to determine the optimal trim condition, the command generator comprising a steady state trim value with an initial trim condition.

12. The flight control system of claim 6, wherein the steady state trim loop utilizes a linear quadratic regulator method with a command generator to determine the optimal trim condition, the command generator comprising a steady state trim value with an initial trim condition; and
    wherein a difference between a current flight state, the steady state trim value, and the initial trim condition is set as a tracking error.

13. The flight control system of claim 1, wherein a lateral heading is automatically engaged when a landing approach is missed.

14. A method for controlling the flight of an aircraft, the method comprising:
    separating a flight control law into flow paths for a longitudinal component and a lateral component;
    passing a longitudinal motion input of the longitudinal component through a longitudinal linear quadratic regulator and a first gain scheduling block;
    passing a lateral motion input of the lateral component through a lateral linear quadratic regulator and a second gain scheduling block;
    regrouping an output from the first gain scheduling block with that of an output of the second gain scheduling block;
    shortening a gain selection with an outer loop utilizing a summary gain design; and
    obtaining a trim flight of the aircraft with a steady state trim loop.

* * * * *

UNITED STATES PATENT AND TRADEMARK OFFICE
CERTIFICATE OF CORRECTION

PATENT NO. : 8,473,124 B2
APPLICATION NO. : 11/665138
DATED : June 25, 2013
INVENTOR(S) : Shyhpyng Jack Shue Page 1 of 1

It is certified that error appears in the above-identified patent and that said Letters Patent is hereby corrected as shown below:

On the Title Page, Item (75), "inventors:," replace "Shillings" with "Schillings."

Signed and Sealed this
First Day of October, 2013

Teresa Stanek Rea
*Deputy Director of the United States Patent and Trademark Office*